(12) United States Patent
Ratnakaram et al.

(10) Patent No.: US 11,816,668 B2
(45) Date of Patent: Nov. 14, 2023

(54) DYNAMIC CONTACTLESS PAYMENT BASED ON FACIAL RECOGNITION

(71) Applicant: Bank of America Corporation, Charlotte, NC (US)

(72) Inventors: Udaya Kumar Raju Ratnakaram, Telangana (IN); Puneetha Polasa, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/567,248

(22) Filed: Jan. 3, 2022

(65) Prior Publication Data

US 2023/0214838 A1    Jul. 6, 2023

(51) Int. Cl.
*G06Q 20/40*    (2012.01)
(52) U.S. Cl.
CPC ............................ *G06Q 20/40145* (2013.01)
(58) Field of Classification Search
CPC ................................................ G06Q 20/40145
See application file for complete search history.

(56) References Cited

U.S. PATENT DOCUMENTS

| | | | |
|---|---|---|---|
| 6,912,312 B1 * | 6/2005 | Milner | G07F 7/1008 |
| | | | 382/218 |
| 9,117,109 B2 | 8/2015 | Nechyba et al. | |
| 9,202,105 B1 * | 12/2015 | Wang | H04N 21/44008 |
| 9,275,269 B1 | 3/2016 | Li et al. | |
| 9,355,530 B1 * | 5/2016 | Block | G06Q 20/405 |
| 10,235,822 B2 | 3/2019 | Nye | |
| 10,346,675 B1 * | 7/2019 | Nagalla | G06V 40/172 |
| 10,769,635 B2 * | 9/2020 | Lindemann | G06F 21/31 |
| 10,997,809 B2 | 5/2021 | Petkov et al. | |
| 2005/0167482 A1 * | 8/2005 | Ramachandran | G06Q 30/0609 |
| | | | 235/379 |
| 2011/0213710 A1 * | 9/2011 | Newman | G07C 9/257 |
| | | | 705/44 |

(Continued)

OTHER PUBLICATIONS

Misra, Arun, Rahul Kumar Dev, and Mr M. Rajasekaran. "Secured payment system using face recognition technique." AIP Conference Proceedings. vol. 2282. No. 1. AIP Publishing LLC, 2020. (Year: 2020).*

*Primary Examiner* — Daniel S Felten
*Assistant Examiner* — Claire A Rutiser
(74) *Attorney, Agent, or Firm* — Banner & Witcoff, Ltd.

(57) ABSTRACT

Arrangements for facial recognition and processing are provided. In some aspects, a request to process a transaction may be received. In response to the request, image data of the user may be captured. The image data may be analyzed using one or more facial recognition techniques. If the user cannot be identified, payment information may be requested from the user. If the user can be identified, the user may be identified and user profile data associated with the user may be retrieved. In some examples, the user profile data may include user contact information, user device identifying information, and the like. User device data may be extracted from the user profile data and a notification including an instruction to initiate payment processing may be generated. The notification may then be transmitted to the user device identified from the extracted data and the instruction may be executed to initiate payment processing.

21 Claims, 11 Drawing Sheets

(56) References Cited

U.S. PATENT DOCUMENTS

| | | | |
|---|---|---|---|
| 2012/0123944 A1* | 5/2012 | Patterson | G07F 19/201, 705/44 |
| 2012/0197743 A1* | 8/2012 | Grigg | G06Q 20/3223, 705/16 |
| 2012/0268245 A1* | 10/2012 | Alexander | G06Q 20/18, 340/5.82 |
| 2013/0057670 A1* | 3/2013 | Fukuda | G06Q 20/40145, 348/E7.085 |
| 2014/0136419 A1* | 5/2014 | Kiyohara | G06Q 20/40145, 705/67 |
| 2014/0140584 A1* | 5/2014 | Lee | G06V 10/7747, 382/118 |
| 2014/0222596 A1* | 8/2014 | S | G06Q 20/20, 705/18 |
| 2015/0039458 A1* | 2/2015 | Reid | A61B 5/117, 705/26.1 |
| 2015/0269583 A1* | 9/2015 | Taylor | G06V 40/172, 705/44 |
| 2017/0004507 A1* | 1/2017 | Henderson | G06Q 20/20 |
| 2017/0323299 A1* | 11/2017 | Davis | G06Q 20/204 |
| 2018/0253730 A1* | 9/2018 | Vohra | G06Q 20/401 |
| 2018/0253805 A1* | 9/2018 | Kelly | G06Q 20/385 |
| 2018/0308100 A1* | 10/2018 | Haukioja | G06Q 20/206 |
| 2018/0349912 A1* | 12/2018 | Fiterman | G06Q 20/3221 |
| 2019/0042835 A1* | 2/2019 | Mostafa | G06F 21/32 |
| 2019/0095737 A1* | 3/2019 | Hecker | G06V 40/40 |
| 2019/0347666 A1* | 11/2019 | Bermudez-Cisneros | H04L 63/08 |
| 2019/0370885 A1* | 12/2019 | Wu | G06Q 20/102 |
| 2020/0097977 A1* | 3/2020 | Guo | G06Q 20/20 |
| 2020/0111103 A1* | 4/2020 | Kalaboukis | G06Q 20/4014 |
| 2020/0137794 A1* | 4/2020 | Bergman | H04L 5/0037 |
| 2020/0228525 A1* | 7/2020 | Boncimino | G06Q 20/40145 |
| 2020/0334682 A1* | 10/2020 | Kang | G06V 40/166 |
| 2021/0004811 A1* | 1/2021 | Zhou | G06Q 20/40145 |
| 2021/0182863 A1* | 6/2021 | Doraiswamy | G06Q 20/02 |
| 2022/0027442 A1* | 1/2022 | Militello | G06Q 20/206 |
| 2022/0067895 A1* | 3/2022 | Maeda | G06Q 20/18 |
| 2022/0277311 A1* | 9/2022 | Hegedus | G06Q 20/02 |

* cited by examiner

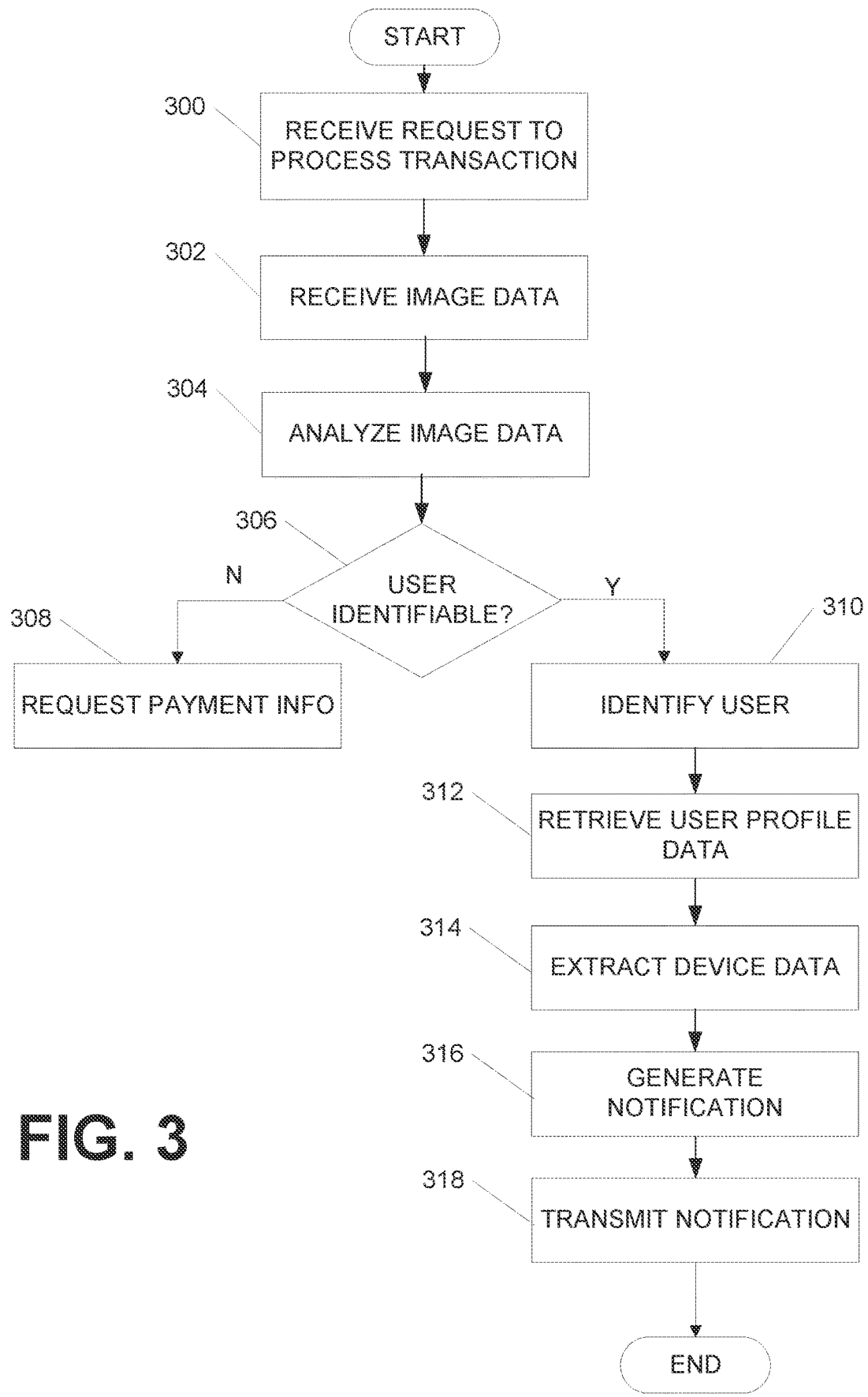

DYNAMIC CONTACTLESS PAYMENT BASED ON FACIAL RECOGNITION

BACKGROUND

Aspects of the disclosure relate to electrical computers, systems, and devices for seamless, automatic payment processing based on facial recognition data.

Electronic payment processing is used by many users. However, conventional electronic payment systems often require user input in the form of payment selection, user identification, or the like. This can be time consuming and, in some examples, may increase risk associated with unauthorized activity.

Additionally, many users frequent a same establishment many times a week, month, or the like. Accordingly, it would be advantageous to leverage the repeat nature of user interactions at a particular establishment to identify and process payments or transactions based on user identification via facial recognition.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with efficiently and quickly processing user transaction.

In some aspects, a request to process a transaction may be received. For instance, a user (such as a registered user who has provided permission or opted in to facial recognition processing) may request a purchase at a merchant or vendor. The request may include event details such as items being purchase, amount of purchase, and the like. In response to the request, image data of the user may be captured. The image data may be analyzed using one or more facial recognition techniques to determine whether the user can be identified (e.g., from pre-stored image data). If the user cannot be identified, payment information may be requested from the user (e.g., debit or credit card, or the like).

If the user can be identified, the user may be identified and user profile data associated with the user may be retrieved. In some examples, the user profile data may include user contact information, user device identifying information, and the like. User device data may be extracted from the user profile data.

A notification including an instruction to initiate payment processing may be generated. The instruction may, in some examples, include an instruction to automatically initiate payment processing (e.g., without user interaction or input). The notification may then be transmitted to the user device identified from the extracted data and the instruction may be executed to initiate payment processing.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 illustrates an illustrative method for implementing facial recognition and processing functions according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, transaction and payment processing can be inefficient and time consuming for users, particularly when dealing with low dollar amount transactions at a merchant that a user frequents. In some arrangements, user must provide a card or cash, input a personal identification number (PIN), provide a one-time code, or the like, to complete the transaction. These additional steps may require additional time and may be inconvenient. Accordingly, aspects described herein provide for seamless transaction processing using facial recognition to identify a user and initiate payment processing.

For instance, users may frequent a same coffee shop several times a week. Accordingly, because the user is a frequent visitor, his or her image may be captured by an image capture device associated with, for instance, a point-of-sale system (e.g., with permission of the user). Upon subsequent visits to the merchant, the user's image may be captured and facial recognition analysis may be used to identify the user, retrieve user profile data and generate instructions to process payments. In some examples, this process may be performed without user input or interaction. Accordingly, the user may get a photo taken and may walk out knowing that his or her purchase has been paid for using the seamless processes described herein.

These and various other arrangements will be discussed more fully below.

Figure 1A:
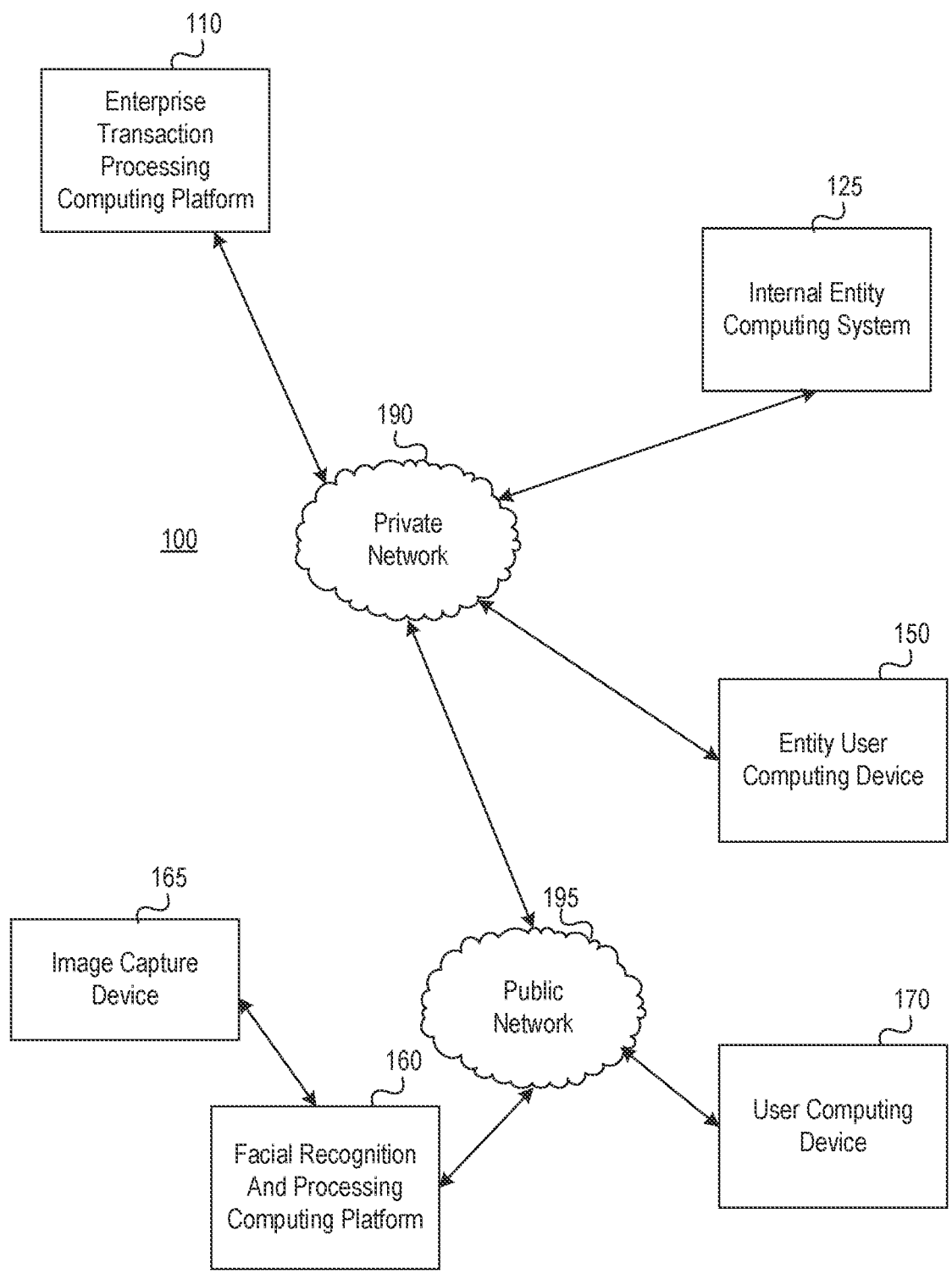
FIGS. 1A-1C depict an illustrative computing environment for implementing facial recognition and processing functions in accordance with one or more aspects described herein.
Figure 1B:
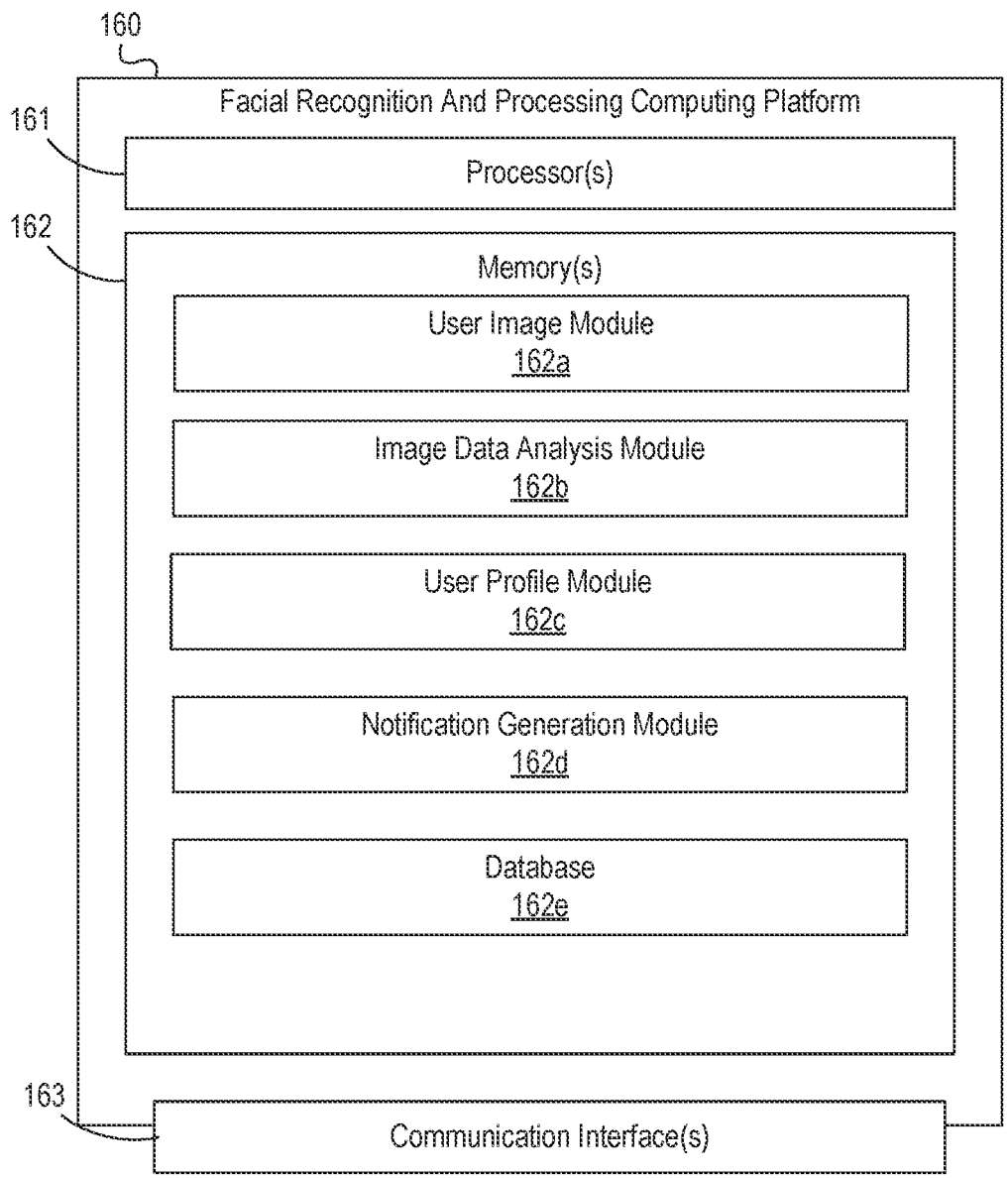
Figure 1C:
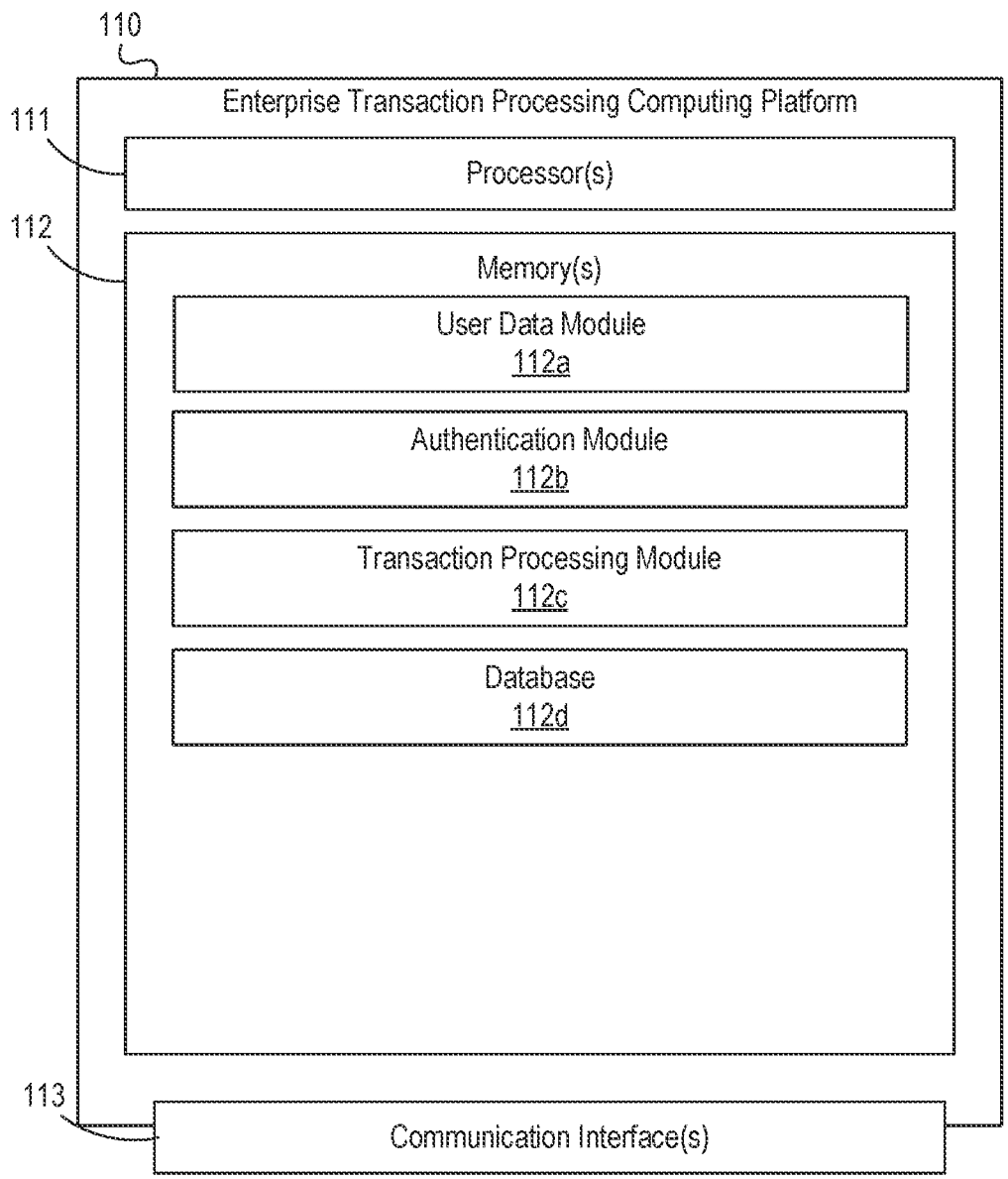

FIGS. 1A-1C depict an illustrative computing environment for implementing and using facial recognition and transaction processing functions in accordance with one or more aspects described herein. Referring to FIG. 1A, computing environment 100 may include one or more computing devices and/or other computing systems. For example, computing environment 100 may include enterprise transaction processing computing platform 110, internal entity computing system 125, entity user computing device 150, facial recognition and processing computing platform 160, image capture device 165, and user computing device 170. Although one internal entity computing system 125, one entity user computing device 150, one facial recognition and processing computing platform 160, one image capture device 165, and one user computing device 170 is shown, any number of systems or devices may be used without departing from the invention.

Further, while aspects may be described in the context of two computing platforms (e.g., a facial recognition and processing computing platform 160 and/or an enterprise transaction processing computing platform 110), in some examples, one or more functions described with respect to each computer platform may be performed by the other platform and/or the two platforms may be integrated into a single platform without departing from the invention. Further, while the enterprise transaction processing computing platform 110 is shown as a computing platform internal to the enterprise organization and the facial recognition and processing computing platform 160 is shown as a computer platform external to the enterprise organization (e.g., a merchant back-end system), in some examples, both computing platforms may be associated with and/or implemented by the enterprise organization (e.g., either as two platforms or a single platform).

Facial recognition and processing computing platform 160 may be configured to provide intelligent, dynamic and seamless payments based on user identification made using facial recognition. For instance, facial recognition and processing computing platform 160 may receive image data from, for instance, an image capture device 165 associated with an external entity system, such as a point-of-sale system. The image data may be captured with permission of the user. In some examples, after a predetermined number of visits to the entity, the user may be given an option to capture image data for use in facial recognition transaction processing. Additionally or alternatively, the user may be given the option to register or enroll on a first visit.

Accordingly, the image may be captured in a first instance of visit (and used as a baseline to establish identity of the user) or may be captured in a second or later instance and used to either act as a baseline or be used to identify the user and process the transaction.

The image capture device 165 may be any suitable image capture device in communication with, for instance, facial recognition and processing computing platform 160. For instance, image capture device 165 may be a web camera connected to or in communication with facial recognition and processing computing platform 160.

If the user is registered with the system, an image captured by the image capture device 165 may be transmitted to a back end system, such as facial recognition and processing computing platform 160. The image data may be compared to pre-stored image data using facial recognition techniques to determine or identify an identity of the user. In some examples, determining or identifying the identity of the user may be based on at least a threshold level of matching between the image captured and the pre-stored image. In some examples, the threshold may be modified based on one or more factors such as frequency of visits/transactions by the identified user, amount of transaction, and the like.

If the captured image matches the pre-stored image to the threshold amount, the user may be identified and user profile data associated with the user may be retrieved. For instance, user profile data may include a phone number associated with a mobile device of the user, such as user computing device 170. A notification may then be generated and transmitted to, for instance, user computing device 170 (which may be the mobile device associated with the phone number identified from the user profile). The notification may include a list of items purchase, cost of each item, a total cost, and the like. The notification may cause initiation of a payment process via an application, such as a mobile banking application hosted by the enterprise organization.

In some examples, the transaction may be automatically processed (e.g., without user interaction). Additionally or alternatively, in some arrangements, user authentication data may be requested, user approval may be requested, or the like.

Enterprise transaction processing computing platform 110 may be or include one or more computing platforms hosted by the enterprise organization, such as a financial institution. The enterprise transaction processing computing platform 110 may, in some examples, receive and analyze image data to identify a user and/or identify payment information for the user. Further, enterprise transaction processing computing platform 110 may receive a payment request from user computing device 170 (e.g., in response to user computing device 170 receiving the notification from facial recognition and processing computing platform 160) and may process the requested payment. For instance, user data may be retrieved and one or more account balances may be modified based on the requested transaction processing. Enterprise transaction processing computing platform 110 may transmit a payment instruction to facial recognition and processing computing platform 160 to complete processing of the requested payment or transaction.

User computing device 170 may include any Internet of Things (IoT) device, such as a smart phone, smart watch, fitness tracker, tablet device, or the like. The user computing device 170 may execute an application, such as a mobile banking application hosted by the enterprise organization, that may receive notifications, transmit data in response, and the like. In some examples, one or more notifications received may include haptic feedback to positively alert the user to the notification. In some examples, near-field communication may be used to detect user computing device 170 near the external entity point-of-sale system and, upon identifying the user from facial recognition data, the location data may be used to confirm an identity of the user, authenticate the user, approve the transaction, or the like.

Further, in examples in which user approval or authenticating information is requested, user input may be received via the user computing device 170 to provide the requested authentication and/or approval.

Internal entity computing system 125 may be or include one or more computing devices or systems associated with or internal to the enterprise organization. For instance, internal entity computing system 125 may store user data, user registration data, account data, and the like. In some examples, internal entity computing system 125 may update one or more account ledgers based on payments or other transactions processed, as described herein.

Entity user computing device 150 may be or include one or more computing devices operated by, for instance, an employee of the enterprise organization to adjust parameters of the facial recognition transaction processing features, modify thresholds for determining a match, and the like.

Computing environment 100 also may include one or more computing platforms. For example, and as noted above, computing environment 100 may include enterprise transaction processing computing platform 110, facial recognition and processing computing platform 160, and the like. As illustrated in greater detail below, enterprise transaction processing computing platform 110 and facial recognition and processing computing platform 160 may include one or more computing devices configured to perform one or more of the functions described herein. For example, enterprise transaction processing computing platform 110 and facial recognition and processing computing platform 160 may include one or more computers (e.g., laptop computers, desktop computers, servers, server blades, or the like). As discussed above, enterprise transaction processing computing platform 110 and facial recognition and processing computing platform 160 may be separate devices or part of a same device, may be operated by a same entity or enterprise organization or different entities or enterprise organizations, and the like, without departing from the invention.

As mentioned above, computing environment 100 also may include one or more networks, which may interconnect one or more of enterprise transaction processing computing platform 110, facial recognition and processing computing platform 160, internal entity computing system 125, entity user computing device 150, image capture device 165, and/or user computing device 170. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, enterprise transaction processing computing platform 110, internal entity computing system 125, entity user computing device 150, may be associated with an enterprise organization (e.g., a financial institution), and private network 190 may be associated with and/or operated by the organization, and may include one or more networks (e.g., LANs, WANs, virtual private networks (VPNs), or the like) that interconnect enterprise transaction processing computing platform 110, internal entity computing system 125, entity user computing device 150, and one or more other computing devices and/or computer systems that are used by, operated by, and/or otherwise associated with the organization. Public network 195 may connect private network 190 and/or one or more computing devices connected thereto (e.g., enterprise transaction processing computing platform 110, internal entity computing system 125, entity user computing device 150) with one or more networks and/or computing devices that are not associated with the organization. For example, facial recognition and processing computing platform 160, image capture device 165, and/or user computing device 170, might not be associated with an organization that operates private network 190 (e.g., because facial recognition and processing computing platform 160, image capture device 165, and/or user computing device 170 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect facial recognition and processing computing platform 160, image capture device 165, and/or user computing device 170 to private network 190 and/or one or more computing devices connected thereto (e.g., enterprise transaction processing computing platform 110, internal entity computing system 125, entity user computing device 150).

Referring to FIG. 1B, facial recognition and processing computing platform 160 may include one or more processors 161, memory 162, and communication interface 163. A data bus may interconnect processor(s) 161, memory 162, and communication interface 163. Communication interface 163 may be a network interface configured to support communication between facial recognition and processing computing platform 160 and one or more networks (e.g., private network 190, public network, or the like). Memory 162 may include one or more program modules having instructions that when executed by processor(s) 111 cause facial recognition and processing computing platform 160 to perform one or more functions described herein and/or one or more databases that may store and/or otherwise maintain information which may be used by such program modules and/or processor(s) 161. In some instances, the one or more program modules and/or databases may be stored by and/or maintained in different memory units of facial recognition and processing computing platform 160 and/or by different computing devices that may form and/or otherwise make up facial recognition and processing computing platform 160.

For example, memory 162 may have, store and/or include user image module 162*a*. User image module 162*a* may store instructions and/or data that may cause or enable the facial recognition and processing computing platform 160 to store a plurality of user images captured with permission of the user. In some examples, the captured user images may be captured as a user makes a purchase at a merchant (e.g., at a point-of-sale device). An image capture device, such as image capture device 165 may capture the image of the user (e.g., with permission) and the image may be stored in the user image module 162*a* and/or database 162*e*. In some examples, each time a user visits the merchant (e.g., makes a purchase or otherwise is in front of or within a viewing angle of the image capture device 165) the user's image may be captured and stored or compared to previously stored images to identify the user as already having a stored image. Each time the user's image is captured, an indication of the visit may also be stored with the user image in the user image module 162*a* and/or in user profile module 162*c*.

Facial recognition and processing computing platform 160 may further have, store and/or include image data analysis module 162*b*. Image data analysis module 162*b* may store instructions and/or data that may cause or enable the facial recognition and processing computing platform 160 to compare a captured image to stored image data (e.g., from the user image module 162*a*). Facial recognition techniques employing various recognition algorithms may be used. For instance, geometric algorithms may be used that evaluate distinguishing features within an image and/or on a person and compare those features to features of pre-stored images. In another example, photo-metric algorithms may be used to associate values with different aspects of an image and compare those values to one or more templates to eliminate variances. Some example algorithms that may be used may include principal component analysis, linear discriminant analysis, elastic bunch graph matching, hidden Markov model, multilinear subspace learning, and/or dynamic link matching. In some examples, three dimensional recognition and/or thermal cameras may be used.

Facial recognition and processing computing platform 160 may further have, store and/or include user profile module 162*c*. User profile module 162*c* may store instructions and/or data that may cause or enable the facial recognition and processing computing platform 160 to store one or more user profiles based on customer visits to the merchant or associated with the enterprise organization. For instance, in a first visit to a merchant, a user profile may be created for a user (e.g., with permission of the user). The user profile may include name, contact information including phone number associated with a mobile device such as user computing device 170, or the like. In some examples, the user profile may include one or more pre-stored images of the user (e.g., captured during one or more previous visits to the merchant). In some arrangements, a user may provide payment information, such as a debit card, credit card, or the like, that may be used to process the payment or transaction.

Facial recognition and processing computing platform 160 may further have, store, and/or include notification generation module 162d. Notification generation module 162d may store instructions and/or data that may cause or enable the facial recognition and processing computing platform 160 to generate one or more notifications associated with a requested payment or event. The one or more notifications may include payment or transaction details (e.g., type of event, amount, itemized list of items purchased, and the like), and/or one or more instructions causing or triggering a device to initiate a payment (e.g., a trigger that when sent to user computing device 170 causes user computing device 170 to initiate payment processing (e.g., via a mobile banking application executing on the device 170)).

Facial recognition and processing computing platform 160 may further have, store and/or include database 162e. Database 162e may store data including image data, profile data, and the like.

Referring to FIG. 1C, enterprise transaction processing computing platform 110 may include one or more processors 111, memory 112, and communication interface 113. A data bus may interconnect processor(s) 111, memory 112, and communication interface 113. Communication interface 113 may be a network interface configured to support communication between enterprise transaction processing computing platform 110 and one or more networks (e.g., private network 190, public network, or the like). Memory 112 may include one or more program modules having instructions that when executed by processor(s) 111 cause enterprise transaction processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of enterprise transaction processing computing platform 110 and/or by different computing devices that may form and/or otherwise make up enterprise transaction processing computing platform 110.

For example, memory 112 may have, store and/or include user data module 112a. User data module 112a may store instructions and/or data that may cause or enable the enterprise transaction processing computing platform 110 to store and/or retrieve user data from, for example, one or more internal entity computing systems 125. In some examples, the user data may include user account data or other payment data to be used to process one or more requested payments or transactions. In some arrangements, user data module 112a may store instructions and/or data to initiate a communication session with one or more other systems or devices, such as internal entity computing system 125, to retrieve data.

Enterprise transaction processing computing platform 110 may further have, store and/or include authentication module 112b. Authentication module 112b may store instructions and/or data that may cause or enable the enterprise transaction processing computing platform 110 to evaluate a request for payment, determine whether one or more rules applies to request authentication data from a user, generate and transmit a request for authentication data and compare received authentication response data to pre-stored data to authenticate the user. In some examples, authentication data might not be required or requested to process the payment or transaction (e.g., small dollar amounts, frequent purchases, or the like). In some arrangements, additional or stepped up authentication data may be required or requested (e.g., a dollar amount outside of an expected pattern, or the like).

Enterprise transaction processing computing platform 110 may further have, store and/or include transaction processing module 112c. Transaction processing module 112c may store instructions and/or data that may cause or enable the enterprise transaction processing computing platform 110 to process one or more transactions or payments (e.g., as initiated and/or requested based on notification transmitted from facial recognition and processing computing platform 160 to user computing device 170). In some examples, the payment processing may be facilitated via a mobile banking application executing on the user computing device 170. Further, transaction processing module 112c may generate and transmit one or more instructions to one or more merchant systems to process the transaction, may generate and transmit one or more instructions to modify an account or ledger, or the like.

Enterprise transaction processing computing platform 110 may further have, store and/or include a database 112d. Database 112d may store data related to purchase history, user data, and the like.

FIGS. 2A-2F depict one example illustrative event sequence for using facial recognition to identify a user and process a transaction in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

Figure 2A:
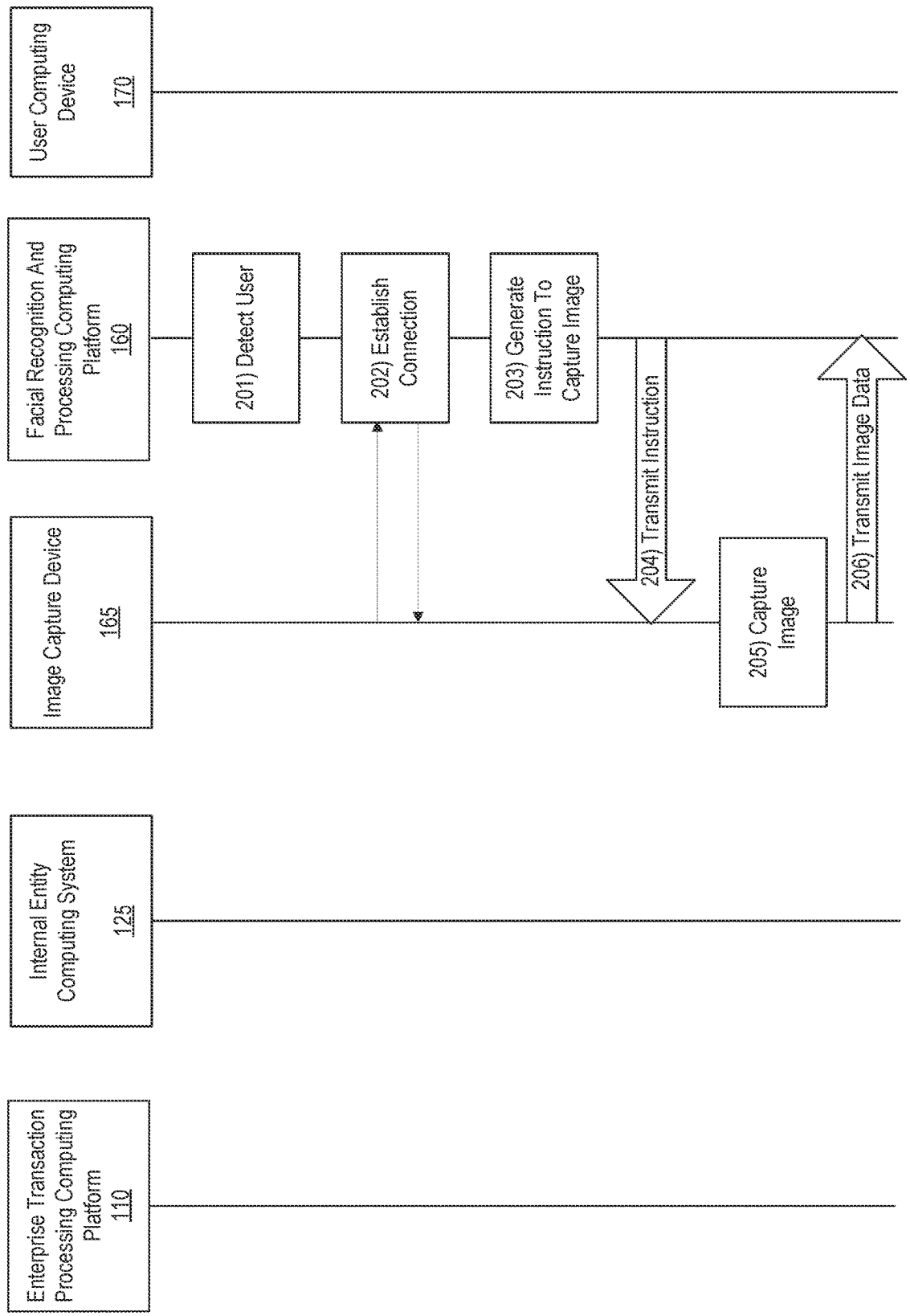
FIGS. 2A-2F depict an illustrative event sequence for implementing facial recognition and processing functions in accordance with one or more aspects described herein.

Referring to FIG. 2A, at step 201, a user device may be detected. For instance, user computing device 170 may be detected by a facial recognition and processing computing platform 160 that may, for example, be located at a merchant (e.g., at or near a point-of-sale system, in communication with a point-of-sale system, or the like). In some examples, facial recognition and processing computing platform 160 may continuously scan for devices within a predefined range (e.g., to identify users who are purchasing items) and may detect a signal emitted from user computing device 170. In another example, facial recognition and processing computing platform 160 may emit a signal that may be detected by user computing device 170 which may then cause transmission of a message indicating a presence of user computing device 170 within a predetermined range of the facial recognition and processing computing platform 160. In some examples, one or more location beacons may be used to transmit and/or detect signals and associated user computing devices.

At step 202, detection of the user computing device 170 may cause facial recognition and processing computing platform 160 to establish a connection between the facial recognition and processing computing platform 160 and image capture device 165. For instance, a first wireless connection may be established between the facial recognition and processing computing platform 160 and image capture device 165. Upon establishing the first wireless connection, a communication session may be initiated between facial recognition and processing computing platform 160 and image capture device 165.

At step 203, facial recognition and processing computing platform 160 may generate one or more instructions to capture an image. For instance, facial recognition and processing computing platform 160 may generate an instruction to capture an image of a user who may be positioned in front of or near the image capture device and/or a point-of-sale system of the merchant.

At step 204, the facial recognition and processing computing platform 160 may transmit the instruction to the image capture device 165. For instance, the instruction may be transmitted during the communication session initiated upon establishing the first wireless connection.

At step 205, the instruction may be received and executed and one or more images may be captured. At step 206, the captured image data may be transmitted from the image capture device to the facial recognition and processing computing platform 160.

Figure 2B:
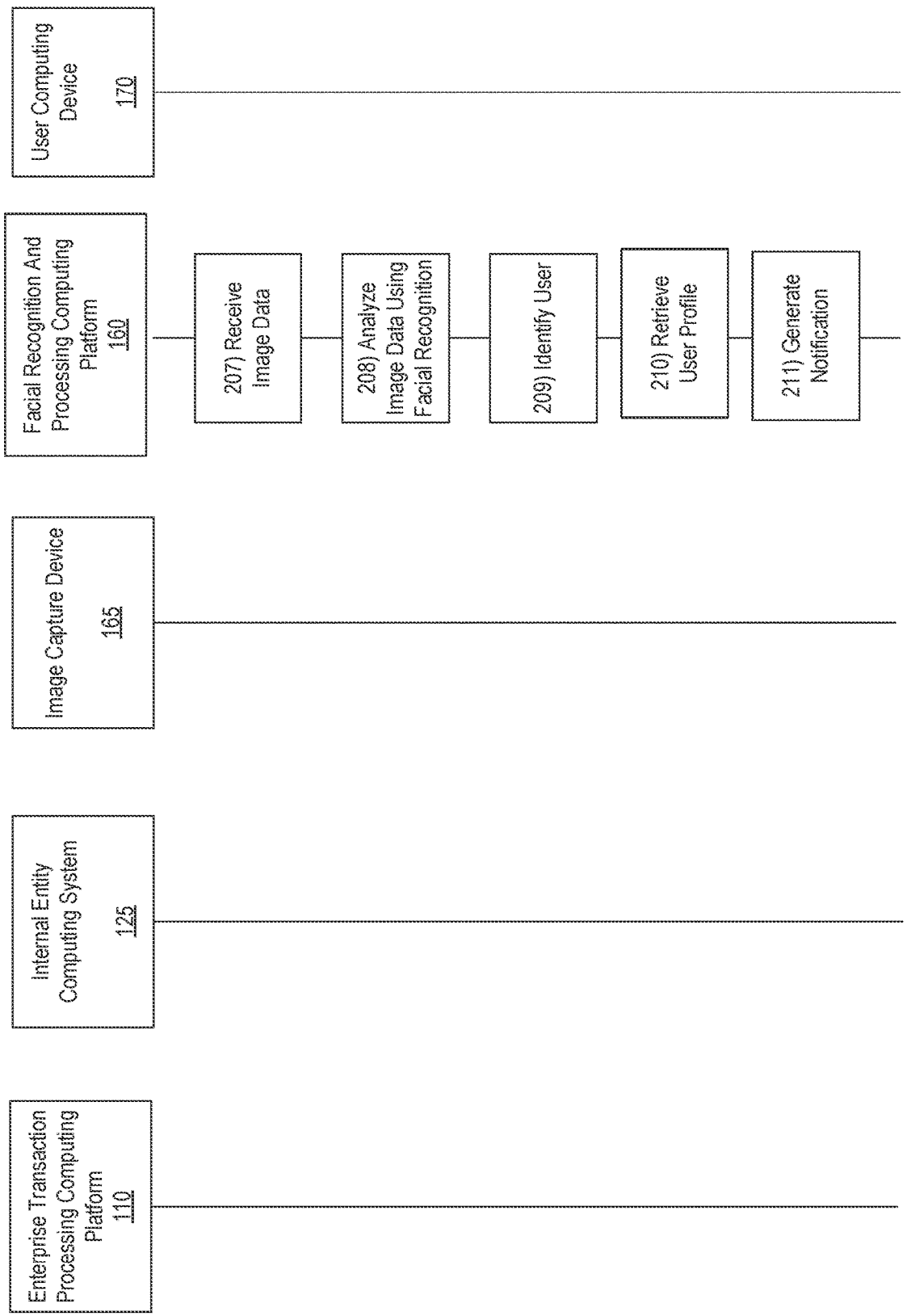

With reference to FIG. 2B, at step 207, the captured image data may be received by the facial recognition and processing computing platform 160.

At step 208, the captured image data may be analyzed using one or more facial recognition techniques to determine whether the user in the captured image matches a user in one or more pre-stored images. For instance, one or more facial recognition techniques may be used to analyze and compare the captured image data or portions thereof to determine whether the captured image data or portions thereof matches pre-stored image data.

If there is a match, step 209, the user in the captured image may be identified. In some examples, identifying a match may include at least a number of points in the captured image matching at least a number of points in the-prestored image. Accordingly, if a user is not looking directly into image capture device 165, in some examples, a match may still be made and a user identified based on at least a predetermined or threshold number of matching points. In some examples, the threshold for matching may vary based on an amount of payment being processed, a frequency of visits by the user to the merchant, and the like.

At step 210, based on the identified user, facial recognition and processing computing platform 160 may retrieve a user profile. For instance, the identified user may be associated with a user profile stored by the facial recognition and processing computing platform 160. That profile may be retrieved to identify contact information for the user and initiate payment.

At step 211, one or more notifications may be generated by the facial recognition and processing computing platform 160. For instance, a notification including event processing details such as an amount of payment, merchant requesting payment, itemized list of purchases, and the like, may be generated. In some examples, the notification may include an instruction to initiate payment on the user computing device 170 via one or more applications executing on the user computing device 170, such as a mobile banking application.

Figure 2C:
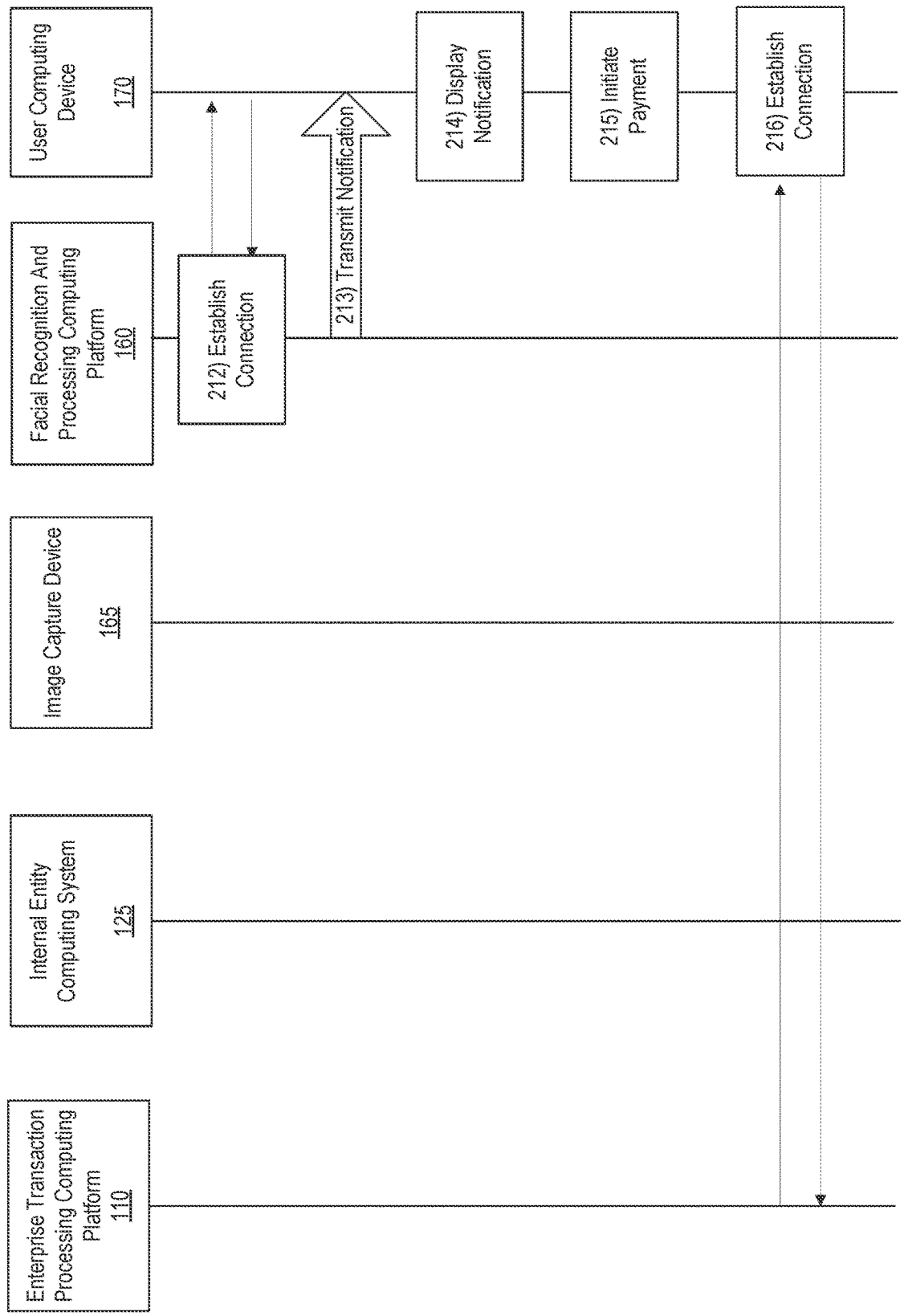

With reference to FIG. 2C, at step 212, a connection may be established between the facial recognition and processing computing platform 160 and user computing device 170. For instance, a second wireless connection may be established between the facial recognition and processing computing platform 160 and user computing device 170. Upon establishing the second wireless connection, a communication session may be initiated between facial recognition and processing computing platform 160 and user computing device 170.

At step 213, the facial recognition and processing computing platform 160 may transmit the generated notification to the user computing device 170. For instance, the generated notification may be transmitted during the communication session initiated upon establishing the second wireless connection.

At step 214, the notification may be received by user computing device 170 and displayed on a display of user computing device 170 or otherwise may alert the user to the notification. For instance, haptic feedback may be initiated in response to the user computing device 170 receiving the notification to alert the user to the notification.

Further, one or more instructions received with the notification may be executed by user computing device 170. For instance, at step 215, a payment processing function may be initiated. In some examples, initiating the payment processing function may include transmitting a request, via an application executing on user computing device 170, to a payment system to process the requested payment.

At step 216, a connection may be established between the user computing device 170 and enterprise transaction processing computing platform 110. For instance, a third wireless connection may be established between the user computing device 170 and the enterprise transaction processing computing platform 110. Upon establishing the third wireless connection, a communication session may be initiated between user computing device 170 and the enterprise transaction processing computing platform 110.

Figure 2D:
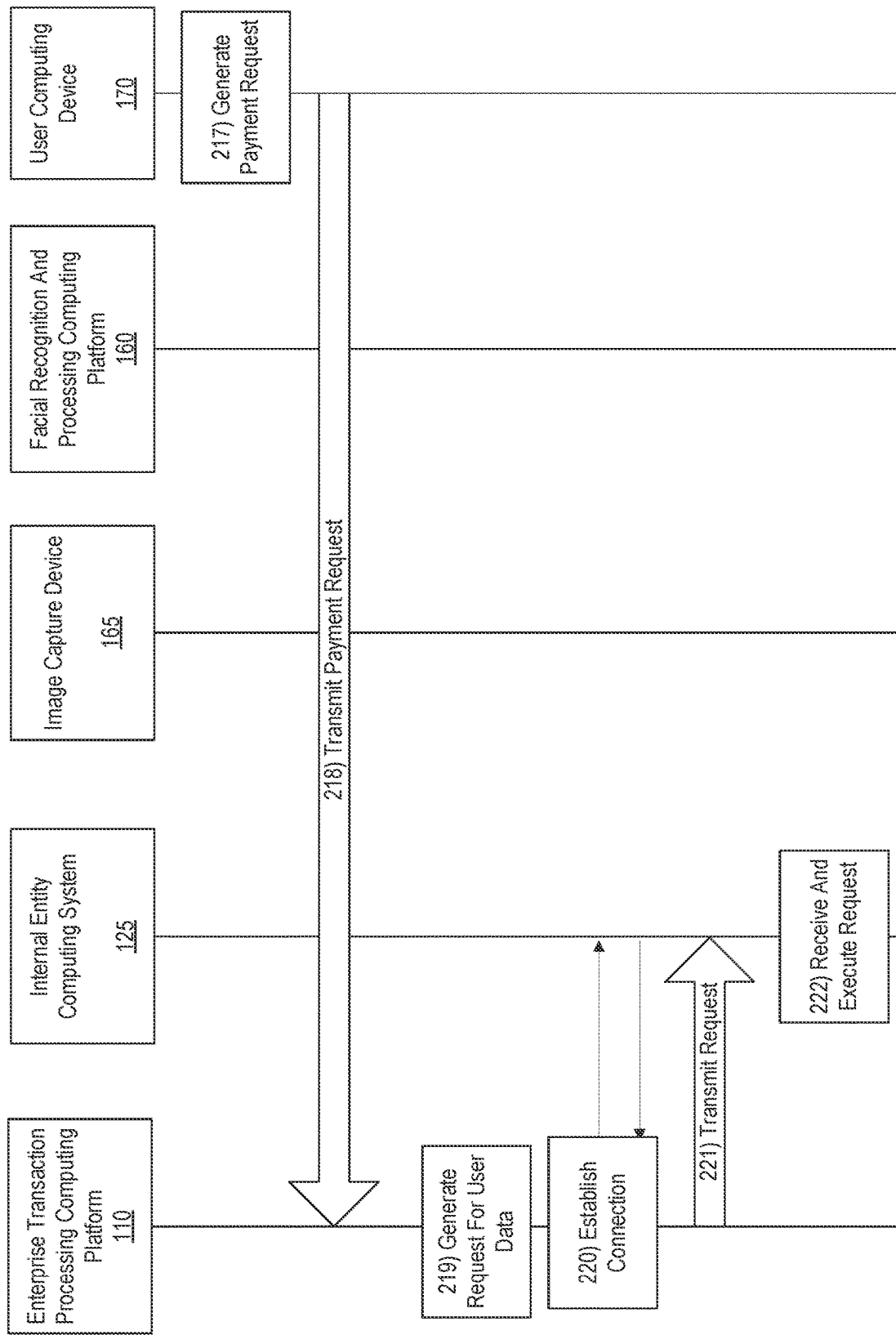

With reference to FIG. 2D, at step 217, a payment request may be generated by user computing device 170. For instance, a request for payment to the merchant that transmitted the notification and event details may be generated. The payment request may include an amount of payment and, in some examples, may be generated via an application executing on the user computing device 170, such as a mobile banking application associated with the enterprise organization.

At step 218, the generated payment request may be transmitted from the user computing device 170 to the enterprise transaction processing computing platform 110. For instance, the payment request may be transmitted during the communication session initiated upon establishing the third wireless connection.

At step 219, the enterprise transaction processing computing platform 110 may receive the payment request and, in response, may generate a request for user data. The request for user data may include a request for user account data, payment mode data, and the like.

At step 220, a connection may be established between the enterprise transaction processing computing platform 110 and internal entity computing system 125. For instance, a fourth wireless connection may be established between the enterprise transaction processing computing platform 110 and the internal entity computing system 125. Upon establishing the fourth wireless connection, a communication session may be initiated between the enterprise transaction processing computing platform 110 and the internal entity computing system 125.

At step 221, the enterprise transaction processing computing platform 110 may transmit the generated request for user data to the internal entity computing system 125. For instance, the request for user data may be transmitted during the communication session initiated upon establishing the fourth wireless connection.

At step 222, the internal entity computing system 125 may receive an execute the request for user data.

Figure 2E:
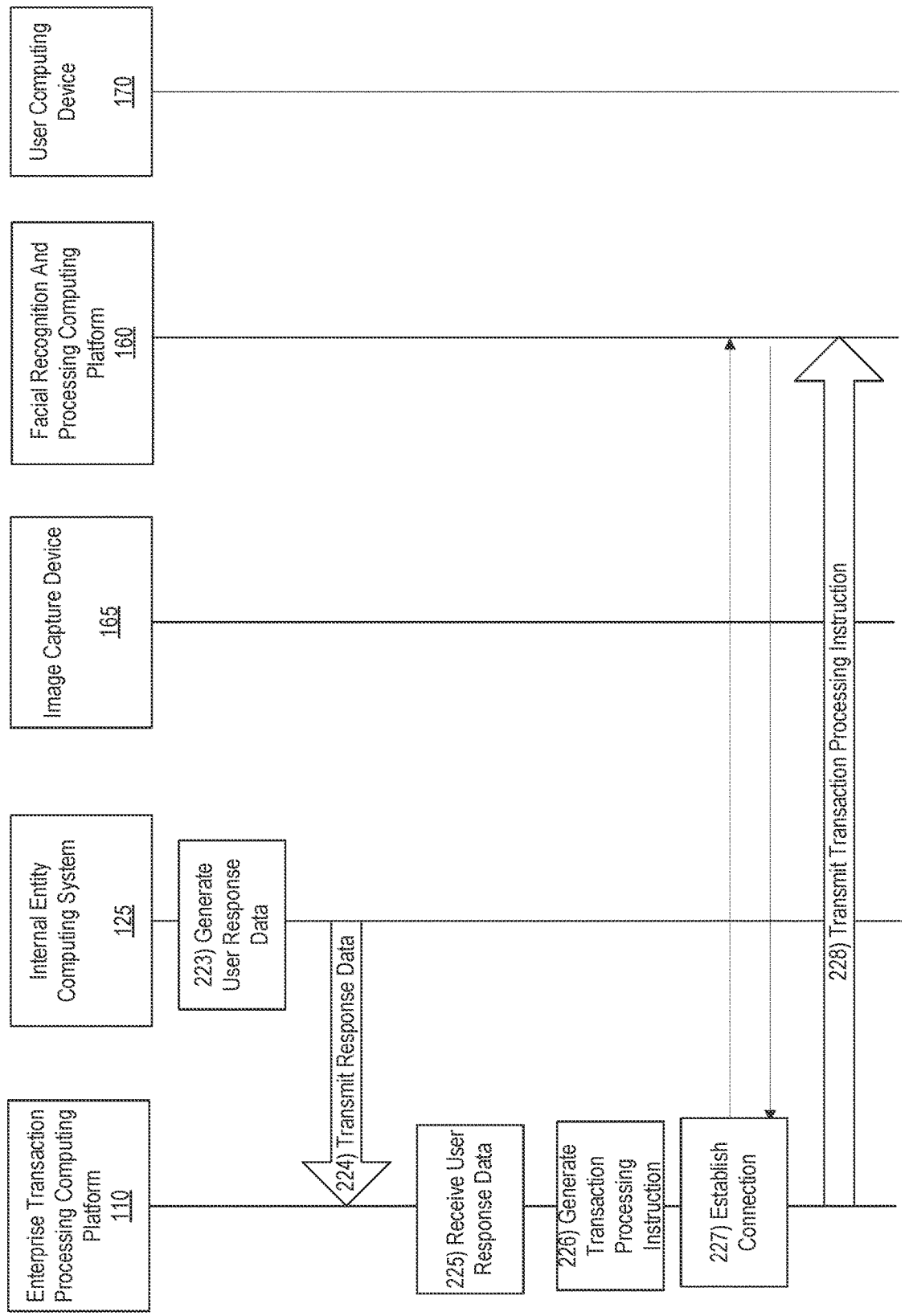

With reference to FIG. 2E, at step 223, in response to receiving and executing the request for user data, internal entity computing system 125 may generate user response data. The user response data may include the requested user data for the user, such as account information, processing authorization, and the like.

At step 224, the internal entity computing system 125 may transmit the user response data to the enterprise transaction processing computing platform 110.

At step 225, the user response data may be received by the enterprise transaction processing computing platform 110.

At step 226, a transaction processing instruction may be generated by the enterprise transaction processing computing platform 110. For instance, the user data and event details associated with the payment request may be analyzed and one or more instructions may be generated. In some examples, analyzing the data may include determining whether one or more criteria to execute a rule are met. For instance, if the transaction amount is greater than a threshold, a rule requesting additional authentication or user authorization may be required and a request for data may be generated with the instruction.

In another example, if the amount is below a threshold, it may quality for automatic processing. If so, the instruction may include an instruction to process the requested payment using, for instance, a payment mode, account, or the like, received from the internal entity computing system 125. The authorization to pay may be performed automatically and without any user input or interaction.

At step 227, if the transaction or payment request qualifies for automatic processing, a connection may be established between the enterprise transaction processing computing platform 110 and facial recognition and processing computing platform 160. For instance, a fifth wireless connection may be established between the enterprise transaction processing computing platform 110 and the facial recognition and processing computing platform 160. Upon establishing the fifth wireless connection, a communication session may be initiated between the enterprise transaction processing computing platform 110 and the facial recognition and processing computing platform 160.

At step 228, the generated transaction processing instruction may be transmitted from the enterprise transaction processing computing platform 110 to the facial recognition and processing computing platform 160.

Figure 2F:
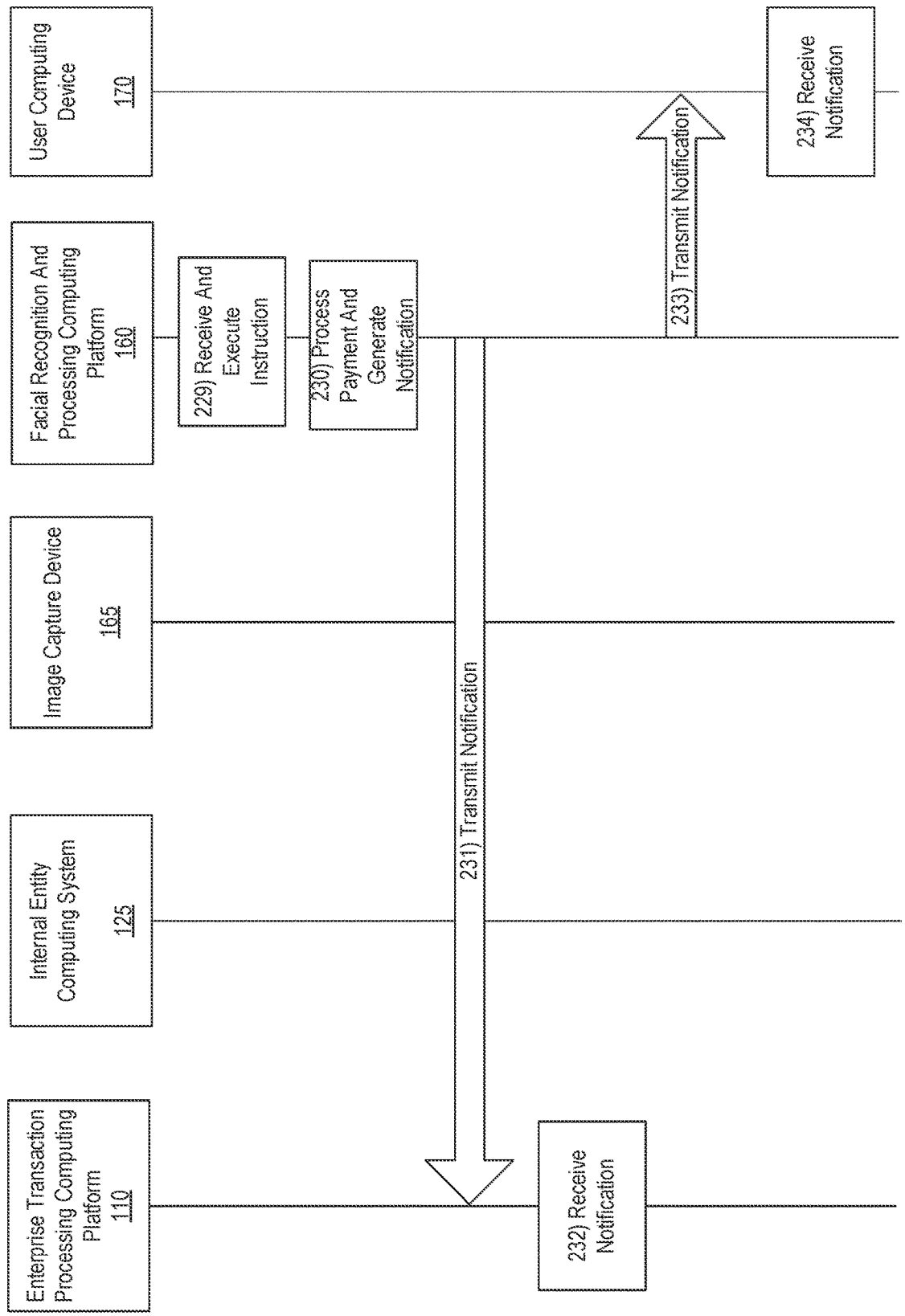

With reference to FIG. 2F, at step 229, the instruction may be received and executed by the facial recognition and processing computing platform 160.

At step 230, the payment or transaction may be processed, funds transferred, account ledgers updated, and the like, and one or more notifications may be generated. For instance, one or more notifications indicating that the payment has been processed, and the like, may be generated.

In some examples, user profile data stored by the facial recognition and processing computing platform 160 may include one or more payment modes associated with the user. Accordingly, in some examples, the payment may be automatically processed using the one or more stored payment modes and without user interaction or enterprise interaction. For instance, if a requested transaction meets certain criteria (e.g., dollar amount below a threshold or the like), a payment mode may be retrieved by the facial recognition and processing computing platform 160 and the transaction may be processed (e.g., without user input, or the like), and steps 215 through 229 may be omitted.

At step 231, one or more notifications may be transmitted by the facial recognition and processing computing platform 160 to the enterprise transaction processing computing platform 110. For instance, a notification confirming payment processing may be transmitted.

At step 232, the notification may be received and one or more accounts, ledgers, and the like, may be updated.

At step 233, one or more notifications may be transmitted to the user computing device 170. For instance, one or more notifications confirming payment processing may be transmitted to the user computing device 170. In some examples, the notifications may include may cause haptic feedback to alert the user to the processing.

At step 234, the notification may be received by user computing device and displayed by user computing device 170.

FIG. 3 is a flow chart illustrating one example method of using facial recognition to identify a user and process a transaction according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time. Further, one or more of the steps described with respect to FIG. 3 may be performed by one or more of enterprise transaction processing computing platform 110, facial recognition and processing computing platform 160, which may be separate platforms or part of a same platform.

At step 300, a request to process a transaction may be received. For instance, a user may approach a merchant point-of-sale system to request transaction processing (e.g., make a purchase). Transaction details, such as amount of transaction, items being purchased, and the like, may be captured or received in the request to process the transaction (e.g., via scanning a bar code on one or more items, via user input, or the like). In some examples, a user device may be detected which may trigger image capture functionality.

At step 302, image data may be received. For instance, image capture device 165 may capture an image of the user requesting transaction processing. The image data may be captured with permission of the user.

At step 304, the captured image data may be analyzed using one or more facial recognition techniques to determine whether the user is identifiable from pre-stored images or image data. For instance, features identified in the captured image may be compared to one or more pre-stored images to determine whether the user can be identified. For instance, if a user frequents a same coffee shop several mornings a week, the user may be identified from image data captured in one or more previous visits.

At step 306, a determination may be made as to whether the user is identifiable based on the facial recognition analysis. If not, payment information may be requested from the user at step 308. For instance, cash, credit or debit card, mobile payment application, or the like, may be requested from the user.

If, at step 306, the user is identifiable, at step 310, the user may be identified (e.g., from the facial recognition analysis).

At step 312, user profile data of the user may be retrieved based on identification of the user. The user profile data may include purchase history at the merchant or vendor, user contact information, user computing device identifying information, and the like. This information may, in some examples, be provided in a registration process and is captured with permission of the user.

At step 314, user device data may be extracted from the user profile data. For instance, a device identifier, phone number associated with the device, or the like, may be extracted from the user profile data.

At step 316, a notification requesting payment may be generated. In some examples, the notification may include details of the transaction including amount, type of transaction, items being purchased, and the like. The notification may include an instruction to initiate payment (e.g., automatically or with user input or approval, a request for additional authentication data or user approval, or the like).

At step 318, the notification may be transmitted to the user device identified from the data extracted from the user profile data. The notification may be executed by the user device which may cause the user device to initiate payment (e.g., via one or more applications executing on the user device). In some examples, the user may be authenticated and/or the transaction approved based on the mobile application executing on the user's device. Accordingly, in some examples, the mobile application (such as a mobile banking application for which the user is a registered user and is logged in) may provide continuous authentication for the user without requiring user input.

The arrangements described herein enable seamless payment or transaction processing with no or minimal interaction required by the user. The arrangements described rely on interactions between a plurality of devices, systems, and the like, to securely complete a transaction. Although various aspects are described with respect to a user making a purchase at a merchant, aspects described herein may be used to process any transaction without departing from the invention.

On example arrangement of implementing aspects described herein is provided below. The example described is merely one example arrangement, and other arrangements may be used without departing from an invention.

In some examples, a user may visit a same coffee shop each weekday before work. Upon approaching the point-of-sale system, the user's image may be captured. In some examples, the image may be captured with each visit and stored (e.g., with the user's profile data) to improve accuracy associated with facial recognition analysis. The user's image may be analyzed using facial recognition techniques and, if the user is identifiable from the image, user profile data may be retrieved. In some examples, determining whether the user is identifiable may vary based on one or more factors. For instance, if an amount of the transaction is above a threshold, outside of a pattern for the user, or the like, greater confidence or at least a certain number of matching points or features may be needed to determine that the user is identifiable or that there is a match between the captured image and the pre-stored images.

In some examples, the user profile data may include historical data related to frequency of visits to the merchant. Accordingly, in some arrangements, fewer matching points or a lower threshold for matching may be used based on frequency of user visits. For a user who occasionally visits this merchant, a greater number of matching points or a higher threshold may be required to consider the user identifiable or to identify the user.

The user profile data may include user device data, such as a device identifier, phone number, or the like. A notification may then be generating requesting payment. The notification may be transmitted to the user device (e.g., via near-field communication, SMS, email, or the like) and executed. Execution may include calling the mobile application executing on the mobile device to initiate payment via one or more payment options associated with the mobile application. The notification may include haptic feedback such that the user may feel the notification and be assured that their payment or transaction has been processed. In some examples, the user device may include a wearable device, such as a smartwatch, that will alert the user to the processing. However, in some examples, no additional input or interaction from the user is needed or required in order to process the transaction.

In some examples, if an amount of the transaction is greater than a threshold amount, user input or interaction may be requested in order to authenticate the user, authorize processing or the like. In some examples, a user may provide a PIN, biometric data, or the like, to provide this additional authentication data. Additionally or alternatively, the a request for input may be displayed by a display of one or more user devices (e.g., smartphone, smartwatch, or the like) and the user may select an option to approve the transaction.

Figure 4:
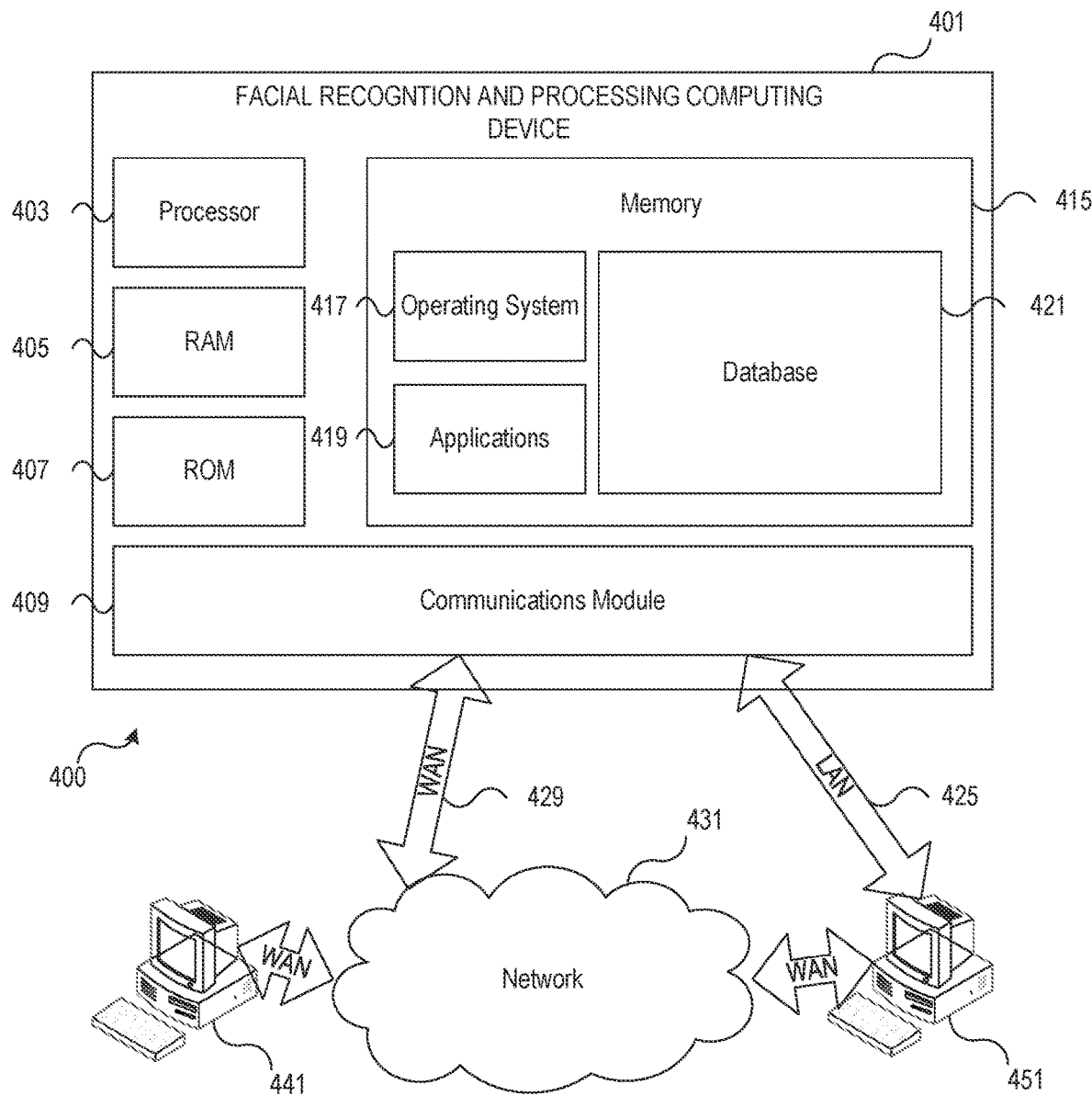
FIG. 4 illustrates one example environment in which various aspects of the disclosure may be implemented in accordance with one or more aspects described herein.

FIG. 4 depicts an illustrative operating environment in which various aspects of the present disclosure may be implemented in accordance with one or more example embodiments. The arrangements described with respect to FIG. 4 may be applied to facial recognition and processing computing platform, enterprise transaction processing computing platform, and/or any devices shown and described herein. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include facial recognition and processing computing device 401 having processor 403 for controlling overall operation of facial recognition and processing computing device 401 and its associated components, including Random Access Memory (RAM) 405, Read-Only Memory (ROM) 407, communications module 409, and memory 415. Facial recognition and processing computing device 401 may include a variety of computer readable media. Computer readable media may be any available media that may be accessed by facial recognition and processing computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by facial recognition and processing computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on facial recognition and processing computing device 401. Such a processor may execute computer-executable instructions stored on a computer-readable medium.

Software may be stored within memory 415 and/or storage to provide instructions to processor 403 for enabling facial recognition and processing computing device 401 to perform various functions as discussed herein. For example, memory 415 may store software used by facial recognition and processing computing device 401, such as operating system 417, application programs 419, and associated database 421. Also, some or all of the computer executable instructions for facial recognition and processing computing device 401 may be embodied in hardware or firmware. Although not shown, RAM 405 may include one or more applications representing the application data stored in RAM 405 while facial recognition and processing computing device 401 is on and corresponding software applications (e.g., software tasks) are running on facial recognition and processing computing device 401.

Communications module 409 may include a microphone, keypad, touch screen, and/or stylus through which a user of facial recognition and processing computing device 401 may provide input, and may also include one or more of a speaker for providing audio output and a video display device for providing textual, audiovisual and/or graphical output. Computing system environment 400 may also include optical scanners (not shown).

Facial recognition and processing computing device 401 may operate in a networked environment supporting connections to one or more remote computing devices, such as computing devices 441 and 451. Computing devices 441 and 451 may be personal computing devices or servers that include any or all of the elements described above relative to facial recognition and processing computing device 401.

The network connections depicted in FIG. 4 may include Local Area Network (LAN) 425 and Wide Area Network (WAN) 429, as well as other networks. When used in a LAN networking environment, facial recognition and processing computing device 401 may be connected to LAN 425 through a network interface or adapter in communications module 409. When used in a WAN networking environment, facial recognition and processing computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
continuously scan for devices within a predefined range that are emitting a signal;
receive a request to process a transaction;
detect, using near-field communication, the signal emitted from a user device within the predefined range;
responsive to detecting the signal, establish a connection to an image capture device associated with a vendor point-of-sale system;
generate and send, to the image capture device associated with the vendor point-of-sale system, an instruction to capture an image of a user associated with the transaction, wherein sending the instruction causes the image capture device to capture the image of the user associated with the transaction;
receive, from the image capture device associated with the vendor point-of-sale system, the image of the user associated with the transaction;
analyze, using one or more facial recognition techniques, the image of the user to determine whether the user can be identified from pre-stored images, pre-stored images including images of a plurality of users captured by the image capture device associated with the vendor point-of-sale system during previous visits to the vendor including payments made via the vendor point-of-sale system;
responsive to determining that the user cannot be identified, request payment information from the user to be used in processing the transaction;
responsive to determining that the user can be identified:
identify the user based on the analysis using the one or more facial recognition techniques;
retrieve, based on the identifying, user profile data;
extract, from the user profile data, data identifying a user device of the identified user;
generate a notification requesting payment to process the transaction, the notification including an instruction to initiate payment processing; and
transmit, to the user device of the identified user, the notification requesting payment to process the transaction.

2. The computing platform of claim 1, wherein the instruction to initiate payment processing includes an instruction to automatically initiate payment processing without user input.

3. The computing platform of claim 1, the instructions further including:

process, via a mobile banking application executing on the user device, the transaction.

4. The computing platform of claim 1, wherein the notification includes haptic feedback.

5. The computing platform of claim 1, wherein the notification includes a request for authentication data.

6. The computing platform of claim 5, in response to transmitting the notification including the request for authentication data:
receive, from the user device, authentication response data;
compare the authentication response data to pre-stored data;
responsive to determining that the authentication response data matches the pre- stored data, process the transaction; and
responsive to determining that the authentication response data does not match the pre-stored data, transmitting a second notification requesting additional authentication data.

7. The computing platform of claim 1, the instructions further including:
responsive to determining that the user can be identified:
analyze transaction details including an amount of the transaction;
determine whether the amount of the transaction is above a threshold;
responsive to determining that the amount of the transaction is above a threshold, generate the notification requesting payment to process the transaction, the notification including the instruction to initiate payment processing and requesting authentication data of the user; and
responsive to determining that the amount of the transaction is below the threshold, generate the notification requesting payment to process the transaction, the notification including the instruction to initiate payment processing, wherein the instruction includes an instruction to automatically initiate payment processing.

8. A method, comprising:
continuously scan, by a computing platform, the computing platform having at least one processor and memory, for devices within a predefined range that are emitting a signal;
receiving, by the at least one processor, a request to process a transaction;
detecting, by the at least one processor and using near-field communication, the signal emitted from a user device within the predefined range;
responsive to detecting the signal, establishing, by the at least one processor, a connection to an image capture device associated with a vendor point-of-sale system;
generating and sending, by the at least one processor and to the image capture device associated with the vendor point-of-sale system, an instruction to capture an image of a user associated with the transaction, wherein sending the instruction causes the image capture device to capture the image of the user associated with the transaction;
receiving, by the at least one processor and from the image capture device associated with the vendor point-of-sale system, the image of athe user associated with the transaction;
analyzing, by the at least one processor and using one or more facial recognition techniques, the image of the user to determine whether the user can be identified from pre-stored images, pre-stored images including images of a plurality of users captured by the image capture device associated with the vendor point-of-sale system during previous visits to the vendor including payments made via the vendor point-of-sale system;
when it is determined that the user cannot be identified, requesting, by the at least one processor, payment information from the user to be used in processing the transaction;
when it is determined that the user can be identified:
identifying, by the at least one processor, the user based on the analysis using the one or more facial recognition techniques;
retrieving, by the at least one processor and based on the identifying, user profile data;
extracting, by the at least one processor and from the user profile data, data identifying a user device of the identified user;
generating, by the at least one processor, a notification requesting payment to process the transaction, the notification including an instruction to initiate payment processing; and
transmitting, by the at least one processor, to the user device of the identified user, the notification requesting payment to process the transaction.

9. The method of claim 8, wherein the instruction to initiate payment processing includes an instruction to automatically initiate payment processing without user input.

10. The method of claim 8, further including:
processing, by the at least one processor and via a mobile banking application executing on the user device, the transaction.

11. The method of claim 8, wherein the notification includes haptic feedback.

12. The method of claim 8, wherein the notification includes a request for authentication data.

13. The method of claim 12, in response to transmitting the notification including the request for authentication data:
receiving, by the at least one processor and from the user device, authentication response data;
comparing, by the at least one processor, the authentication response data to pre- stored data;
when it is determined that the authentication response data matches the pre-stored data, processing, by the at least one processor, the transaction; and
when it is determined that the authentication response data does not match the pre-stored data, transmitting, by the at least one processor, a second notification requesting additional authentication data.

14. The method of claim 8, further including:
when it is determined that the user can be identified:
analyzing, by the at least one processor, transaction details including an amount of the transaction;
determining, by the at least one processor, whether the amount of the transaction is above a threshold;
when it is determined that the amount of the transaction is above a threshold, generating, by the at least one processor, the notification requesting payment to process the transaction, the notification including the instruction to initiate payment processing and requesting authentication data of the user; and
when it is determined that the amount of the transaction is below the threshold, generating, by the at least one processor, the notification requesting payment to process the transaction, the notification including the instruction to initiate payment processing, wherein the instruction includes an instruction to automatically initiate payment processing.

15. One or more non-transitory computer-readable media storing instructions that, when executed by a computing platform comprising at least one processor, memory, and a communication interface, cause the computing platform to:
continuously scan for devices within a predefined range that are emitting a signal;
receive a request to process a transaction;
detect, using near-field communication, the signal emitted from a user device within the predefined range;
responsive to detecting the signal, establish a connection to an image capture device associated with a vendor point-of-sale system;
generate and send, to the image capture device associated with the vendor point-of-sale system, an instruction to capture an image of a user associated with the transaction, wherein sending the instruction causes the image capture device to capture the image of the user associated with the transaction;
receive, from the image capture device associated with the vendor point-of-sale system, the image of athe user associated with the transaction;
analyze, using one or more facial recognition techniques, the image of the user to determine whether the user can be identified from pre-stored images, pre-stored images including images of a plurality of users captured by the image capture device associated with the vendor point-of-sale system during previous visits to the vendor including payments made via the vendor point-of-sale system;
responsive to determining that the user cannot be identified, request payment information from the user to be used in processing the transaction;
responsive to determining that the user can be identified:
identify the user based on the analysis using the one or more facial recognition techniques;
retrieve, based on the identifying, user profile data;
extract, from the user profile data, data identifying a user device of the identified user;
generate a notification requesting payment to process the transaction, the notification including an instruction to initiate payment processing; and
transmit, to the user device of the identified user, the notification requesting payment to process the transaction.

16. The one or more non-transitory computer-readable media of claim 15, wherein the instruction to initiate payment processing includes an instruction to automatically initiate payment processing without user input.

17. The one or more non-transitory computer-readable media of claim 15, the instructions further including:
process, via a mobile banking application executing on the user device, the transaction.

18. The one or more non-transitory computer-readable media of claim 15, wherein the notification includes haptic feedback.

19. The one or more non-transitory computer-readable media of claim 15, wherein the notification includes a request for authentication data.

20. The one or more non-transitory computer-readable media of claim 19, in response to transmitting the notification including the request for authentication data:
receive, from the user device, authentication response data;
compare the authentication response data to pre-stored data;

responsive to determining that the authentication response data matches the pre-stored data, process the transaction; and responsive to determining that the authentication response data does not match the pre-stored data, transmitting a second notification requesting additional authentication data.

21. The one or more non-transitory computer-readable media of claim 15, the instructions further including:

responsive to determining that the user can be identified:
analyze transaction details including an amount of the transaction;
determine whether the amount of the transaction is above a threshold;
responsive to determining that the amount of the transaction is above a threshold, generate the notification requesting payment to process the transaction, the notification including the instruction to initiate payment processing and requesting authentication data of the user; and
responsive to determining that the amount of the transaction is below the threshold, generate the notification requesting payment to process the transaction, the notification including the instruction to initiate payment processing, wherein the instruction includes an instruction to automatically initiate payment processing.

\* \* \* \* \*